R. MARLATT.
PUPPET VALVE.
APPLICATION FILED NOV. 3, 1910.
1,024,642.
Patented Apr. 30, 1912.
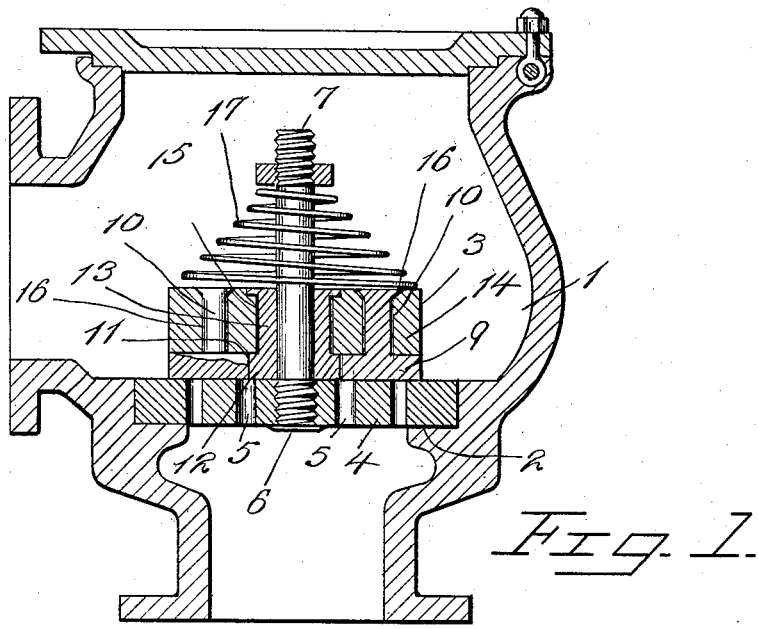
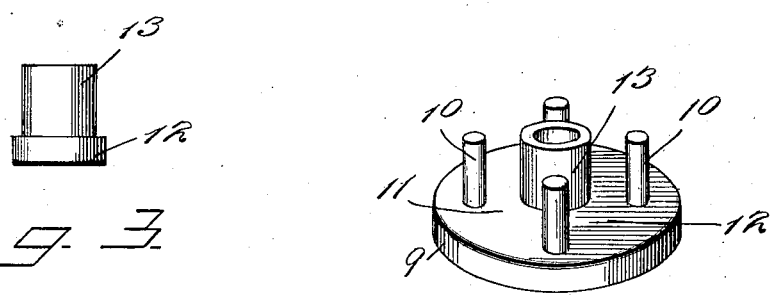
Witnesses
A. M. Simpson
L. M. Gillespie
Inventor
Robert Marlatt
Alex J. Wedderburn, Jr.
Attorney

UNITED STATES PATENT OFFICE.

ROBERT MARLATT, OF CARNEGIE, PENNSYLVANIA, ASSIGNOR OF ONE-HALF TO JAMES CONNELL, OF CARNEGIE, PENNSYLVANIA.

PUPPET-VALVE.

1,024,642.          Specification of Letters Patent.          Patented Apr. 30, 1912.

Application filed November 3, 1910. Serial No. 590,494.

*To all whom it may concern:*

Be it known that I, ROBERT MARLATT, citizen of the United States, residing at Carnegie, in the county of Allegheny and State of Pennsylvania, have invented certain new and useful Improvements in Puppet-Valves, of which the following is a specification.

This invention relates to improvements in puppet valves and its principal object is to produce a means to prolong the life of a valve plate.

Another object of the invention is to provide a valve having a valve plate with a removable bushing thereon and still another object of the invention is to provide a valve having a valve plate consisting of a soft and a hard metal plate, and means for holding the plates in fixed relations to one another.

With the above and other objects in view, I have invented the puppet valve illustrated in the accompanying drawings, in which—

Figure 1, is a vertical sectional view through a valve chamber having my improved valve seated therein. Fig. 2, is a perspective view of a valve member and bushing used therewith, and Fig. 3, is a view of a bushing.

Referring to the accompanying drawings, 1 indicates a valve chamber provided with a valve seat or base 4, upon which is seated my improved valve 3. This valve seat or base 4, is provided with a number of openings 5, and a stem 6, which is fixed thereto, and has its upper end 7, screw-threaded to receive a nut 8, which holds the spring 17, in place.

Seated on the base 4, and slidably mounted on the stem 6, is a valve member consisting of a Babbitt or soft metal plate 9, which has integral arms 10, and is provided in its center with an enlarged opening 11, in which the head 12, of the bushing 13, is seated. This bushing head is of a thickness equal to the thickness of the plate 9, and its upper and lower surfaces are flush with the upper and lower surfaces of said plate.

A plate 14, of hard metal having a central opening 15, for the reception of the bushing 13, and openings 16, is mounted on the plate 9, and is held in fixed relation thereto by the arms 10 on the plate 9, which pass through the openings 16, and are riveted on and flush with the upper surface thereof.

The bushing 13, fits over the stem 6, and engages both plates 9, and 14, being riveted flush with the upper surface of the plate 14, and as often as this bushing is worn away it may be replaced by a new one. The spring 17, is seated on the plate 14, and holds the valve normally closed.

The constant movement of the valve member 3, causes a friction against the stationary stem 6, and in other valves quickly wears the valve plate where it contacts the stem, destroying the utility of the plate, which is usually of soft metal, and consequently wears rapidly, the purpose of the bushing is therefore to move vertically on the stem with the valve member and to receive the wear, then when necessary the bushing which is loosely connected to the plates and is removable therefrom, can readily be replaced.

I claim and desire to secure by Letters Patent:

1. A puppet valve consisting of a seat, a stem thereon, a sliding bushing on said stem, a valve member removably fixed to said bushing, said valve member consisting of removably connected hard and soft metal plates.

2. A puppet valve consisting of a seat, a stem thereon, a bushing on said stem, a valve member fixedly mounted on said bushing, said valve member and bushing having vertical movement on said stem, said bushing being removable from said valve member, said valve member consisting of hard and soft metal plates removably connected by means of arms on said soft metal plate passing through openings in said hard metal plate and their ends spread into flares in said openings.

In testimony whereof I affix my signature, in presence of two witnesses.

ROBERT MARLATT.

Witnesses:
  GUS A. BEARD,
  ESMA RANKIN.

---

Copies of this patent may be obtained for five cents each, by addressing the "Commissioner of Patents, Washington, D. C."